(12) United States Patent
Lemmens et al.

(10) Patent No.: US 9,134,796 B2
(45) Date of Patent: Sep. 15, 2015

(54) FOLDABLE TACTILE DISPLAY

(75) Inventors: Paul Lemmens, Eindhoven (NL); Floris Maria Hermansz Crompvoets, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 43 days.

(21) Appl. No.: 13/264,103

(22) PCT Filed: Apr. 13, 2010

(86) PCT No.: PCT/IB2010/051585
§ 371 (c)(1),
(2), (4) Date: Oct. 12, 2011

(87) PCT Pub. No.: WO2010/119397
PCT Pub. Date: Oct. 21, 2010

(65) Prior Publication Data
US 2012/0032906 A1 Feb. 9, 2012

(30) Foreign Application Priority Data
Apr. 15, 2009 (EP) .................................. 09157902

(51) Int. Cl.
*G06F 3/041* (2006.01)
*G06F 3/01* (2006.01)

(52) U.S. Cl.
CPC .............. *G06F 3/016* (2013.01); *G06F 3/011* (2013.01); *G06F 3/0414* (2013.01)

(58) Field of Classification Search
CPC ............................. G06F 1/163; G06F 1/1616
USPC ................................................. 345/156–173
See application file for complete search history.

(56) References Cited

U.S. PATENT DOCUMENTS

| 7,082,570 | B1 * | 7/2006 | von Wiegand et al. | ........ 715/702 |
| 7,967,679 | B2 * | 6/2011 | Ombrellaro et al. | ............ 463/30 |
| 2004/0010390 | A1 * | 1/2004 | Kelly et al. | .................... 702/150 |
| 2004/0068211 | A1 | 4/2004 | Leivseth et al. | |
| 2005/0092832 | A1 | 5/2005 | Gough et al. | |
| 2005/0113167 | A1 * | 5/2005 | Buchner et al. | ................. 463/30 |
| 2006/0277680 | A1 | 12/2006 | Goetz | |
| 2008/0052837 | A1 | 3/2008 | Blumberg | |
| 2008/0094226 | A1 | 4/2008 | O'Shea et al. | |

(Continued)

FOREIGN PATENT DOCUMENTS

| CN | 101206522 A | 6/2008 |
| EP | 1533678 A1 | 5/2005 |
| GB | 2241894 A | 9/1991 |

OTHER PUBLICATIONS

Iwai et al: "Smart-Furoshiki:RFID-Embedded Cloth Enabling Multiple Area Detection"; 27th Conference on Distributed Computing Systems Workshops (ICDCSW'07), 2007 IEEE, pp. 1-5.

(Continued)

*Primary Examiner* — Carolyn R Edwards (57) ABSTRACT

The present invention relates to a foldable tactile display (1) and a method of operating it. The foldable tactile display comprises a plurality of actuators (2), one or more sensors (3-6), and a computing unit (7). The computing unit is able to control the plurality of actuators in response to the received command signals and sensor signals. In an embodiment, the tactile foldable display is used in connection with multimedia content. The foldable tactile display may be in the form of a tactile blanket.

19 Claims, 3 Drawing Sheets (56) References Cited

U.S. PATENT DOCUMENTS

2010/0017759 A1* 1/2010 Birnbaum et al. ............ 715/863
2011/0216064 A1* 9/2011 Dahl et al. .................... 345/428

OTHER PUBLICATIONS

Hoshi et al: "Gravity-Based 3D Shape Measuring Sheet"; SICE Annual Conference, 2007, pp. 2126-2131.

* cited by examiner

FOLDABLE TACTILE DISPLAY

FIELD OF THE INVENTION

The invention relates to a foldable tactile display, such as a tactile blanket, comprising sensors and actuators.

BACKGROUND OF THE INVENTION

Haptic technology provides an interface to a user via the sense of touch by applying forces, vibrations and/or motions to the user, i.e., in haptic technology a haptic device may provide stimulation to the user. When the stimulation is directed to perception by touch, the device is often referred to as a tactile device. One example of a known haptic device is a game controller. A game controller could, for example, be used to simulate a race car steering wheel by providing the user with the "perception of the road". As the user makes a turn or accelerates, the steering wheel responds by resisting turns or slipping out of control. A game controller can also be configured for tactile feedback that is perceived via the skin, such as a vibration, e.g., in response to the user's car touching the guardrail.

An example of a tactile device is disclosed in the English patent GB 2 241 894. In this patent a massage mat consists of cells disposed in a rectangular form, enveloped, for example, in synthetic leather, and controlled by an external control unit. Specifically, the massage is manually activated by the user by pushing the buttons on the controller, thus deciding massaging area, intensity and duration of the action.

While the massage mat offers a tactile sensation to the user, it is limited to a single person usage and controlled manually by the user herself, thus supporting only a one-way type of communication (i.e., from the control unit to the mat of cells).

SUMMARY OF THE INVENTION

The inventors have had the insight that there is a need in the art for a more generic solution for conveying a tactile stimulation to a user. In particular, the inventors have realized that there is a need in the art for a tactile device which is versatile in its use, which is not limited to a single user, which can be worn by a user, but which is not limited to a specific spatial or oriental relationship between the tactile device and the user. Moreover, there is a need in the art for a tactile device which can be used in combination with multimedia applications. In general, there is a need for a multimodal sensory tactile device which is portable, manageable and flexible in use.

The present invention addresses the above needs by providing, in a first aspect, a foldable tactile display comprising:

a computing unit adapted to receive command signals and sensor signals;

a plurality of actuators distributed in the foldable tactile display;

one or more sensors distributed in the foldable tactile display, the one or more sensors being connected to the computing unit;

wherein the plurality of actuators are controllable by the computing unit in response to the received command signals and the sensor signals.

A foldable tactile display is a tactile device which comprises a coherent arrangement of actuators, where the display can be folded or draped so as to accommodate the shape of an object or user. The invention adds the functionality of tactile stimulation to a foldable object, and thereby provides a tactile display capable of a multimodal sensory experience.

In an embodiment, the foldable tactile display is a tactile blanket which may be folded or draped around a person. Moreover, at least a surface layer of the foldable tactile display may be textile-based, such as based on a synthetic or a natural textile material. By using a textile material a tactile display may be provided which is perceived in a manner similar to a normal blanket, but with the tactile functionality.

Various types of sensors may be applied. In an advantageous embodiment, the one or more sensors comprise an orientation sensor for automatically detecting an orientation of the foldable tactile display. The use of orientation sensors renders it possible to provide a tactile display which is not dependent on a predefined oriental relationship between the tactile display and the user. Thus by using orientation sensors, a user is not limited by requirements on how to orient the tactile display in a situation of use.

The tactile display may moreover comprise such sensors as pressure sensors and proximity sensors.

The tactile display may comprise folding lines along which a folding configuration can be detected from sensor readouts. The folding lines may be areas or regions especially adapted, e.g., by a sewing line, to ensure folding around these lines, or they may be the folding areas which come about when the display is folded, but which are not pre-adapted for folding.

While the foldable tactile display may be used in different situations, it is may especially advantageously used in the context of entertainment and emotional immersion. By adding tactile stimulation to multimedia content a more emotional experience can be provided. A foldable tactile display is a very generic tactile device which can be used in a large variety of ways in contrast to such devices as game controllers, etc.

In an advantageous embodiment, the computing unit uses the actual orientation detected by the one or more orientation sensors to adapt predefined tactile patterns either stored in the blanket or transmitted to the blanket by an external computing device. The computing unit may based on a received command signal to select a predefined actuator configuration and based on the sensor signals determine whether or not the predefined actuator configuration should be reconfigured to generate a reconfigured actuator configuration, so as to control the plurality of actuators in accordance with the resulting actuator configuration. Alternatively any reconfiguration may be computed in the external computing device, and the computing unit may simply receive a command signal reflecting the resulting actuator configuration. By using a database of predefined reconfigurable actuator configurations stored in the tactile blanket or in an external computing device, a computing unit with limited computing power may be used, since the computational operations involved may be kept at a minimum. This facilitates a computing unit with reduced sized and reduced power consumption.

The foldable tactile display may form part of a tactile stimulation system further comprising a command units communicatively connected to the computing unit. The command unit may be part of a multimedia system or separate from such a system, for example it may be a remote control.

In a second aspect, the invention relates to a method of operating a foldable tactile display according to the first aspect of the invention. The method comprises receiving command signals and sensor signals and inputting these signals into the computing unit; and controlling the plurality of actuators by means of the computing unit in response to the received command signals and the sensor signals.

In general the various aspects of the invention may be combined and coupled in any way possible within the scope of the invention. These and other aspects, features and/or advantages of the invention will be apparent from and elucidated with reference to the embodiments described hereinafter.

BRIEF DESCRIPTION OF THE DRAWINGS

Embodiments of the invention will be described, by way of example only, with reference to the drawings, in which.

DESCRIPTION OF EMBODIMENTS

Embodiments of a foldable tactile display 1, 20, 44 are disclosed in the following. The foldable tactile display is described in terms of a tactile blanket. However, it is to be understood that the invention is not limited to this embodiment. Other foldable tactile displays include, but are not limited to, cushions, covers, vests, jackets, trousers, hats and other garment. Embodiments of the present invention intend to render possible normal use of a blanket, such as in connection with covering of a person or persons, or as a cushion or cover in a couch or chair on which persons can sit or lean to. In embodiments, the fabric of the blanket is such that it can be draped to a certain extend freely by the user. This introduces challenges with use of pre-programmed tactile emotion patterns, because the orientation of the blanket with respect to the user as well as the folding configuration of the tactile display is unknown a priori. It may be important to know the orientation, for example in connection with using pre-programmed patterns describing a tactile effect going from top to bottom in a blanket that is in upright position with respect to a blanket that is in oblong position would result in two totally different effects, i.e., a top to bottom effect versus a left to right effect, respectively.

Figure 1:
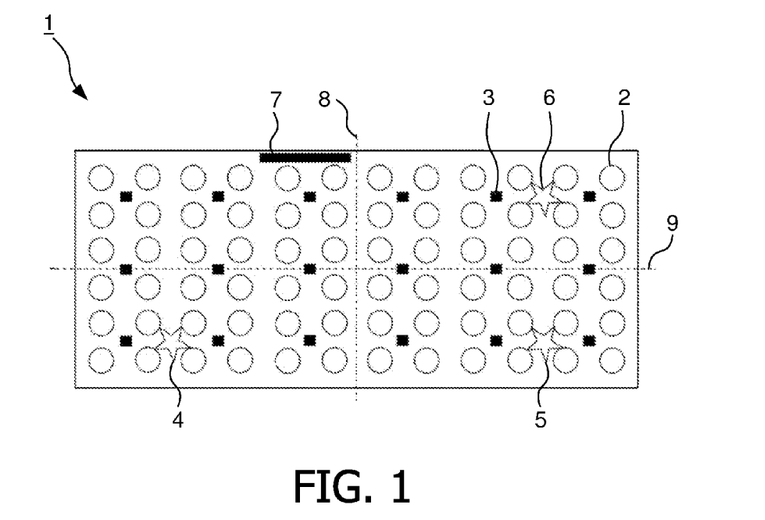
FIG. 1 shows a foldable tactile display in the form of a tactile blanket with sensors, actuators, two folding lines and a computing unit.

FIG. 1 illustrates a tactile blanket 1 which comprises a plurality of actuators 2 and sensors 3, 4, 5, 6. Two types of sensors are illustrated: pressure sensors 3 and orientation sensors 4, 5, 6. The orientation sensors may be in the form of acceleration sensors (accelerometers), which are sensors able to detect the direction of gravity. The one or more sensors are connected to a computing unit 7 adapted to receive both command signals and sensor signals. The actuators 2 are evenly distributed and embedded in the blanket 1 in order to accommodate tactile stimuli over the entire blanket. In general, however, the distribution pattern of the actuators may be in various types of patterns. The plurality of actuators 2 is controllable by the computing unit 7. Examples of actuators can be vibrating eccentric mass motors (EMC), heaters (e.g., resistive elements), coolers (e.g., peltier elements), electroactive polymers, Transcutaneous Electro Nerve Stimulation (TENS), piezo actuators, shape memory alloys, etc.

Moreover, in addition to, or instead of, pressure sensors other sensors could be used, such as proximity sensors. Examples of proximity sensors tailored for the range of applications of the tactile blanket can be optical sensors, capacitive sensors, inductive sensors, infrared reflection sensors, etc.

In the embodiment of FIG. 1, the pressure sensors 3 are evenly distributed across the tactile blanket 1. The pressure sensors are used to determine an area on the blanket which is in contact with the user. For example, the pressure sensors may be used to determine the number of users sitting on the blanket and where on the blanket 1 the one or more persons are sitting down. In the situation where one or more users have draped the blanket around them, the pressure sensors may be used to determine the contact area between the blanket and the one or more users. This information may be inputted in the computing unit 7 so as to control the plurality of actuators 2 in response to the detected number and position of the one or more users.

In the illustrated embodiment, three orientation sensors 4, 5, 6 are used for detecting the orientation of the tactile blanket 1. The detected orientation is inputted in the computing unit 7 so as to control the plurality of actuators 2.

Figure 5A:
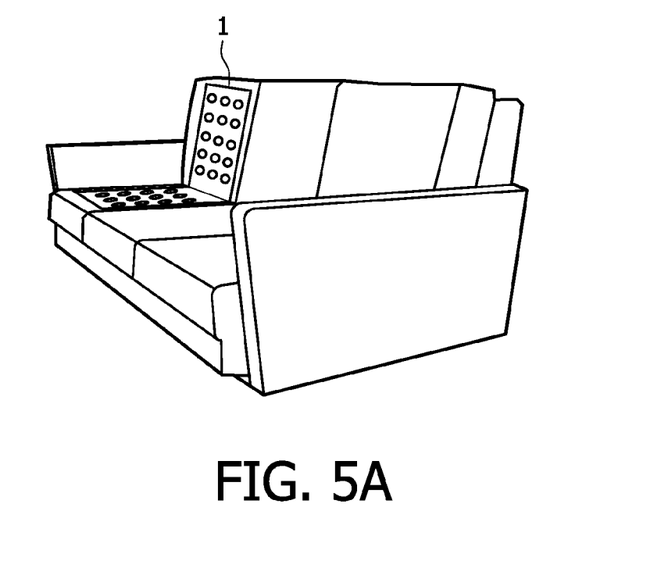
FIGS. 5A and 5B show two examples of folding configurations of a tactile blanket: upright and flat, respectively.
Figure 5B:
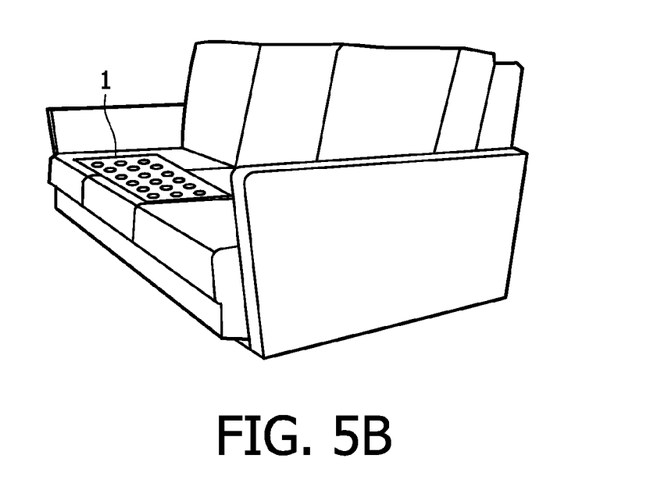

In the illustrated embodiment, the tactile blanket 1 comprises two folding lines 8, 9, so that it can be folded along the one or both of them. Examples of folding configurations are (in the following $\parallel$ and $\perp$ stand for parallel and perpendicular orientation, respectively): (1) accelerometer 4 $\parallel$ accelerometer 5 $\parallel$ accelerometer 6: the blanket 1 is flat (cf. FIG. 5B); (2) accelerometer 4 $\perp$ accelerometer 5 $\parallel$ accelerometer 6: the blanket 1 is folded along the vertical dashed folding line 8 (cf. FIG. 5A); and (3) accelerometer 4 $\parallel$ accelerometer 5 $\perp$ accelerometer 6: the blanket is folded along the horizontal dashed folding line 9.

In the illustrated embodiment, the orientation detected by the orientation sensors 4, 5, 6 is inputted in the computing unit 7 so as to determine a folding configuration of the tactile blanket 1 along the one or more folding lines 8, 9 and so as to control the plurality of actuators 2 in response to the folding configuration. In the case of two folding lines, three orientation sensors is the minimum to handle all orientations and folding configurations on the blanket. Indeed, in this embodiment, more orientation sensors would add to the cost of the blanket and do not offer more information.

In a different embodiment, switches or other means may be used for determining the folding configuration. For example, if a switch is inserted in the tactile blanket with its two electrical contacts lying on opposite sides of the folding line, whenever the tactile blanket is folded, the switch is activated and the computing unit is able to retrieve the corresponding folding configuration. This method, as well as the abovementioned one making use of orientation sensors, permits automatic detection of the folding configuration.

Figure 2:
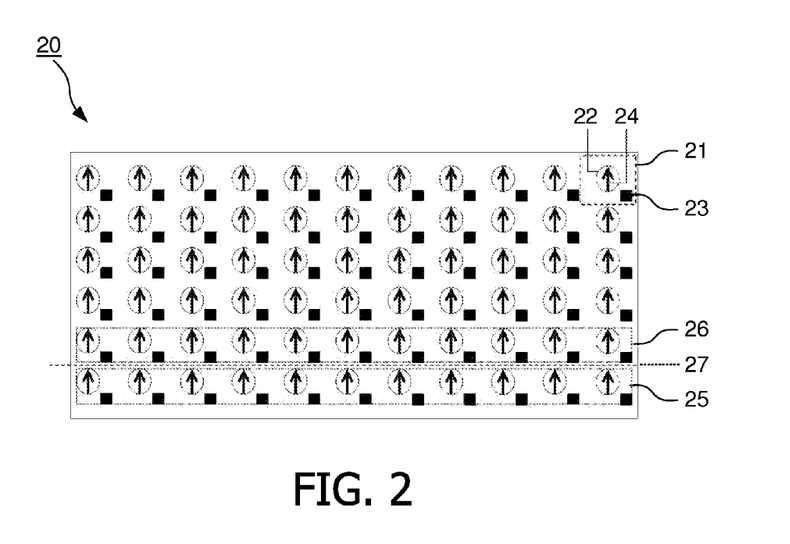
FIG. 2 shows a tactile blanket with multiple folding lines and integrated units, each containing an actuator, a pressure sensor and an accelerometer.
Figure 3:
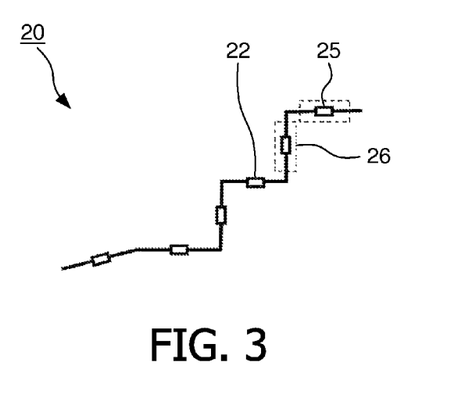
FIG. 3 shows a side view of the tactile blanket in FIG. 2 with its actuators and illustrates aspects related to multiple folding lines.

FIG. 2 depicts an embodiment of a tactile blanket with a large number of folding lines. The tactile blanket 20 comprises a number of integrated units 21, which embed an actuator 22, a pressure sensor 23 and an accelerometer 24. To detect a folding line, the read-outs of the orientation sensors are compared. Practically, if two adjacent lines of orientation sensors 25, 26 have different read-outs (per line) then a folding line 27 is detected as being present between them. This is further illustrated in FIG. 3, which shows a side view of the tactile blanket 20 with its actuators 22. For example, taken the two rows of actuators 25, 26, the first one has a value of gravitational acceleration g=0, while the second one has g=+1, therefore a folding line is detected in between. Acceleration data can be averaged per line to make a more accurate distinction when the folding angle is relatively shallow; this permits to differentiate between cases with g=0 and g=+0.1, for example. It is preferred that all orientation sensors are sewed in the blanket in the same direction; in the current example it is necessary to have the orientation sensors in the same direction.

In a situation of use, the tactile blanket may receive command signals. Such command signals may originate from a user selection. A user may, e.g., select a given actuation program by means of a command unit or controller. The command unit may in embodiments be integrated with the tactile blanket or may be detached but connected to the tactile blanket, e.g., by means of a remote control or other control means. In embodiments, the controller may be a wireless unit. The controller may also be part of a multimedia system as described in connection with FIG. 4.

In an embodiment, the computing unit comprises a storage means, such as a small memory chip, where it stores a database of predefined patterns of actuator configurations. The computing unit may, based on a received command signal, select a predefined actuator configuration. Based on the received sensor signals, the predefined actuator configuration may be reconfigured to generate a reconfigured actuator configuration.

In a general embodiment, calculations related to the actuator configuration of the tactile blanket can be done either in a computing device separate from the blanket, e.g. a device forming part of multimedia system or in the tactile blanket itself. In the first case, two-way communication is required to transfer the readouts of the sensors to the computing device. Hence, the processing power of the tactile blanket can be rather low. In the second case, the computing device sends the patterns to the tactile blanket, which recalculates them based on the sensors input; this may require a higher processing power.

In the following, the embodiment computation in the computing unit of the blanket is assumed.

In operation, the tactile blanket retrieves its orientation and folding configuration and the computing unit adapts, chooses or assembles the tactile pattern that is most suited for the current situation. For some patterns it may only be necessary to know the orientation of the blanket, i.e. if the pattern runs from top to bottom, whereas some patterns may require a more thorough reconfiguration. Some patterns are body-part specific, which means that they are only suitable for use in connection with particular parts of the human body, like upper legs, back, buttocks, etc. Based on a received command signal, the computing unit selects a predefined actuator configuration and, based on the sensor signals, determines whether or not the patterns should be reconfigured, and if so reconfigures it to generate the actual one, the resulting pattern is used to control the plurality of actuators.

The measurements performed by the sensors result in the determination of the orientation and folding configuration of the tactile blanket. These measurements are used to reconfigure, e.g. by adaptation and combination of the specific patterns mentioned above.

The reconfiguration may be a two-dimensional rotation of the patterns carried out by means of the rotation matrix $$A = \begin{pmatrix} \cos(\alpha) & \sin(\alpha) \\ -\sin(\alpha) & \cos(\alpha) \end{pmatrix},$$

where $\alpha$ is the rotation angle determined from the sensor readings. In the special case of $\alpha=90$ degrees, we obtain $$A = \begin{pmatrix} 0 & 1 \\ -1 & 0 \end{pmatrix}.$$

The reconfiguration may apply scaling by use of the scaling matrix $$B = \begin{pmatrix} a & 0 \\ 0 & b \end{pmatrix},$$

where a and b are the scaling parameters for the two dimensions, a need not necessarily be equal to b.

Below, a non-exhaustive list of the possible orientation and folding configurations of the tactile blanket as illustrated in FIG. 1 is provided:

If the tactile blanket 1 is upright and folded and only one person is detected (cf. FIG. 5A), the predefined tactile patterns for back, buttocks and upper legs are combined and corrected in orientation by using proper matrix rotation, translation or scaling procedures to generate the reconfigured actuator configuration.

If the tactile blanket is not upright and not folded and only one person is detected, the reconfigured actuator configuration is based on the predefined tactile patterns for buttocks and upper legs.

If the tactile blanket 1 is not upright and not folded and multiple persons are detected (FIG. 5B), the reconfigured actuator configuration is based on the predefined tactile patterns for buttocks and upper legs which are combined, duplicated and adjusted for multiple persons and corrected in orientation.

If the tactile blanket is not upright and is folded along the long axis (i.e., folding line 9 in FIG. 1), if only one person is detected and most weight is coming from the buttocks, the reconfigured actuator configuration is based on the predefined tactile patterns for buttocks are extracted from the database and corrected in orientation and folding.

Corrections for folding can consist in:

Combining one pattern, suitably corrected into a single overlaid matrix (i.e., doubling the tactile display resolution, e.g., going from 64×64 to 128×128). In this case, the output amplitude to the motors may be increased to compensate for the double layers of cloth and electronics in between.

Using each set of actuators as a separate display matrix, so that via one matrix tactile pattern A is displayed and via the other matrix tactile pattern B is displayed, the combination of A and B possibly having special effects. For instance, a special effect could be activating two opposite patterns at the same time on the same location, such as a pattern going from top to bottom and a pattern going from bottom to top.

If the blanket is not upright and folded along the long axis, if multiple persons are detected and most weight is coming from the buttocks, the reconfigured actuator configuration is based on the predefined tactile patterns for buttocks corrected in orientation and folding.

The tactile blanket has a configuration that is the combination of the previous two and moreover the weight from the upper legs is detected.

If the tactile blanket is not upright and folded along the short axis (i.e., folding line 8 in FIG. 1) and only one person is detected, the reconfigured actuator configuration is based on the predefined tactile patterns for buttocks and upper legs corrected in orientation and folding.

If the tactile blanket is not upright and folded along the short axis and multiple persons are detected, the reconfigured actuator configuration is based on the predefined tactile patterns for buttocks and upper legs corrected in orientation and folding.

Alternatively, the tactile blanket can be draped around a person. This can be done in a number of ways, for example: (a) around the upper legs to stimulate the front and the back of the upper legs as well as the buttocks; (b) around the torso to stimulate the front and the back of the torso (i.e., back, belly and chest); (c) on the front of the upper legs and on the front of the torso; and (d) draped around the body (in a ventral or dorsal mode): this is a sort of free mode, where the pressure and/or accelerometer sensor readings may be ambiguous; therefore, in this situation the user can either select her own tactile patterns or provide input to the type of tactile patterns to be used, e.g., by means of the controller.

A similar list of possible orientation and folding configurations can be made for the embodiment of FIG. 2.

Figure 4:
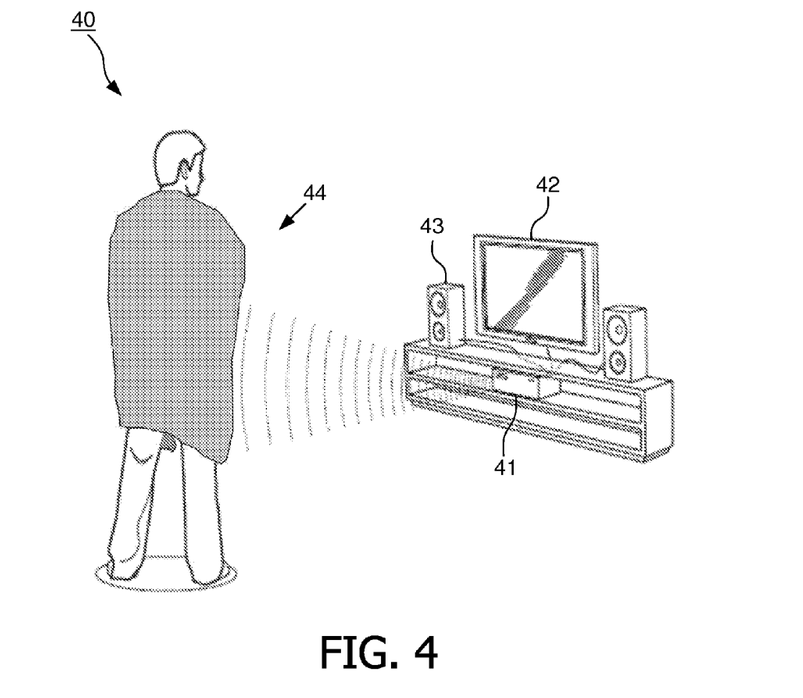
FIG. 4 shows a tactile blanket draped on a user and attached to a tactile stimulation system, such as a home entertainment system.

FIG. 4 illustrates a tactile stimulation system 40, which comprises a metadata player 41 connected to a display device 42, speakers 43 and the tactile blanket 44. The metadata player 41 is an electronic device capable of extracting tactile stimulation information from a metadata file and controlling the tactile blanket 44 based on this information. Here, the metadata player 41 has the functionality of video rendering for display on the display device 42 and audio rendering for the speakers 43 based on a media clip contained in the metadata file. However, in an alternative embodiment the metadata player 41 may be a complementary device (not shown) connected to a multimedia device, such as a DVD player, which handles the audio and video rendering devices. Also, the metadata player may be combined with or comprised in a multimedia device such as a DVD player, a multimedia computer, and the like.

In an embodiment, the metadata player 41 processes a metadata file, and renders video and audio data contained in a video stream to the TV-screen 42 and to the speakers 43, respectively. Moreover, the metadata player 41 processes the tactile data included in the metadata file and plays the tactile stimulation patterns as prescribed in the pattern sequence. For each pattern played, steering signals are transmitted from the metadata player 41, via the wireless communication link, to the computing unit in the tactile blanket 44. The steering signals are then used to activate the appropriate actuators, which stimulate the skin of the person the tactile blanket is draped around to. Since the patterns are synchronized with the content of the media clip, properly timed emotions are conveyed to that person, thereby enhancing her multimedia experience. Basically, as a pattern is played, the corresponding bodily response associated with an emotion can be simulated. For instance, in order to enhance feelings of fear, shivers down a person's spine can be simulated by sequentially driving the actuators in the tactile blanket that are placed along that specific region. For user convenience, the tactile actuators can be switched on and off by a mute button on the controller, for example.

In order to minimize wire lengths inside the tactile blanket, the position of the electronics for control and communication and the battery may be chosen to be as central as possible. Furthermore, the communication between the computing unit inside the tactile blanket and the tactile simulation system may occur via Bluetooth, ZigBee or other wireless protocols. As we only transmit pattern information, the data rate can be rather low (<20 kB/s for 100 Hz refresh).

The invention can be implemented in any suitable form including hardware, software, firmware or any combination of these. The invention or some features of the invention can be implemented as computer software running on one or more data processors and/or digital signal processors. The elements and components of an embodiment of the invention may be physically, functionally and logically implemented in any suitable way. Indeed, the functionality may be implemented in a single unit, in a plurality of units or as part of other functional units. As such, the invention may be implemented in a single unit, or may be physically and functionally distributed between different units and processors.

Although the present invention has been described in connection with the specified embodiments, it is not intended to be limited to the specific form set forth herein. Rather, the scope of the present invention is limited only by the accompanying claims. In the claims, the term "comprising" does not exclude the presence of other elements or steps. Additionally, although individual features may be included in different claims, these may possibly be advantageously combined, and the inclusion in different claims does not imply that a combination of features is not feasible and/or advantageous. In addition, singular references do not exclude a plurality. Thus, references to "a", "an", "first", "second" etc. do not preclude a plurality. Furthermore, reference signs in the claims shall not be construed as limiting the scope.

The invention claimed is:

1. A foldable tactile display that can be folded so as to accommodate a shape of an object or user, said foldable tactile display comprising;
   a computing unit adapted to receive command signals and sensor signals;
   a plurality of actuators distributed in the foldable tactile display;
   a plurality of sensors distributed in the foldable tactile display, the plurality of sensors being connected to the computing unit;
   a plurality of folding lines adapted for folding the foldable tactile display along the plurality of folding lines; and
   a plurality of integrated units arranged in a matrix on the foldable tactile display, each of said plurality of integrated units including at least one actuator of the plurality of actuators, an accelerometer, and at least one sensor of the plurality of sensors;
   wherein the plurality of actuators are controllable by the computing unit in accordance with a predefined actuator configuration selected based on a received command signal; and
   wherein the computing unit is further adapted to determine, based on at least the foldable tactile display's orientation, whether or not the predefined actuator configuration should be reconfigured to generate a reconfigured actuator configuration so as to control the plurality of actuators in accordance with the reconfigured actuator configuration, wherein two sensors of the plurality of sensors are configured for detecting a folding line of the plurality of folding lines, wherein measurements performed by the plurality of sensors result in the determination of the orientation.

2. The foldable tactile display according to claim 1, wherein the plurality of sensors comprise an orientation sensor fir detecting an orientation of the foldable tactile display, and wherein the orientation is inputted in the computing unit so s to control the plurality of actuators in response to the detected orientation.

3. The foldable tactile display according to claim 1, wherein the plurality of sensors comprise at least one orientation sensor for detecting an orientation of the sensor, and wherein the orientation is inputted in the computing unit so as to determine a folding configuration of the foldable tactile display along the plurality of folding lines and so as to control the plurality of actuators in response to the folding configuration.

4. The foldable tactile display according to claim 3, wherein the plurality of actuators and the at least one orientation sensor are arranged in one or more integrated units, where each integrated unit comprises an actuator and an orientation sensor, wherein the orientation of the one or more integrated units is inputted in the computing unit so as to determine a folding configuration of the foldable tactile display along the plurality of folding lines and so as to control the plurality of actuators in response to the detected folding configuration.

5. The foldable tactile display according to claim 1, wherein the plurality of sensors comprise a pressure sensor for detecting the presence of one or more users, and wherein a number of the one or more users is inputted in the computing unit so as to control the plurality of actuators in response to the detected the number of the one or more users.

6. The foldable tactile display according to claim 1, wherein the plurality of sensors comprise a pressure sensor for detecting a position of one or more users, and wherein the position of the one or more users is inputted in the computing unit so as to control the plurality of actuators in response to the detected position of the one or more users.

7. The foldable tactile display according to claim 1, wherein the computing unit stores a database of predefined actuator configurations, and wherein the computing unit based on the received command signal selects the predefined actuator configuration.

8. The foldable tactile display according to claim 1, wherein the computing unit accesses a database of predefined actuator configurations comprised in an external computing device, wherein the external computing device selects the predefined actuator configuration based on the received command signal and based on the sensor signals determines whether to generate the reconfigured actuator configuration, the reconfigured actuator configuration is forwarded to the computing unit so as to control the plurality of actuators in accordance with the reconfigured actuator configuration.

9. The foldable tactile display according to claim 1, wherein the received command signal is based on multimedia contents.

10. The foldable tactile display according to claim 1, wherein at least a surface layer of the foldable tactile display is textile-based.

11. The foldable tactile display according to claim 1, wherein the computing unit is further adapted to determine, based on the foldable tactile display's orientation and folding configuration, whether or not the predefined actuator configuration should be reconfigured to generate the reconfigured actuator configuration.

12. The foldable tactile display according to claim 11, wherein measurements performed by the plurality of sensors result in the determination of the folding configuration.

13. A tactile stimulation system, the tactile stimulation system comprises:
   a foldable tactile display that can be folded so as to accommodate a shape of an object or user, the foldable tactile display comprising;
      a computing unit adapted to receive command signals and sensor signals;
      a plurality of actuators distributed in the foldable tactile display;
      a plurality of sensors distributed in the foldable tactile display, the plurality of sensors being connected to the computing unit;
   plurality of folding lines adapted for folding the foldable tactile display along the plurality of folding lines;
   a plurality of integrated units arranged in a matrix on the foldable tactile display, each of said plurality of integrated, units including at least one actuator of the plurality of actuators, an accelerometer, and at least one sensor of the plurality of sensors; and
   a command unit communicatively connected to the computing unit;
   wherein the command signals received by the computing unit are provided by the command unit;
   wherein the plurality of actuators are controllable by the computing unit in accordance with a predefined actuator configuration selected based on a received command signal; and
   wherein the computing unit is further adapted to determine, based on at least the foldable tactile display's orientation, whether or not the predefined actuator configuration should he reconfigured to generate a reconfigured actuator configuration so as to control the plurality of actuators in accordance with the reconfigured actuator configuration, wherein two sensors of the plurality of sensors are configured for detecting a folding line of the plurality of folding lines, wherein measurements performed by the plurality of sensors result in the determination of the orientation.

14. The tactile stimulation system according to claim 13, wherein the command unit is communicatively connected to a multimedia rendering device, and wherein the command signal is based on a signal received from the multimedia rendering device.

15. The tactile stimulation system according to claim 13, wherein the computing unit is further adapted to determine, based on the foldable tactile display's orientation and folding configuration, whether or not the predefined actuator configuration should be reconfigured to generate the reconfigured actuator configuration.

16. The tactile stimulation system according to claim 15, wherein measurements performed by the plurality of sensors result in the determination of the folding configuration.

17. A method of operating a foldable tactile display, wherein the foldable tactile display can be folded so as to accommodate a shape of an object or user, the foldable tactile display comprises:
   a computing unit adapted to receive command signals and sensor signals;
   a plurality of actuators distributed in the foldable tactile display;
   a plurality of sensors distributed in the foldable tactile display, the plurality of sensors being connected to the computing unit;
   a plurality of folding lines adapted for folding the foldable tactile display along the plurality of folding lines; and
   a plurality of integrated units arranged in a matrix on the foldable tactile display, each of said plurality of integrated units including at least one actuator of the plurality of actuators, ml accelerometer, and at least one sensor of the plurality sensors;
   and wherein the method comprises:
   receiving command signals and sensor signals and inputting these signals into the computing unit; and
   controlling the plurality of actuators by means of the computing unit in accordance with a predefined actuator configuration selected based on a received command signal; and
   determining whether or not the predefined actuator configuration should be reconfigured based on at least the foldable tactile display's orientation to generate a reconfigured actuator configuration so as to control the plurality of actuators in accordance with the reconfigured actuator configuration, wherein two sensors of the plurality of sensors are configured for detecting a folding line of the plurality of tiding lines, wherein measurements performed by the plurality of sensors result in the determination of the orientation.

18. The method according to claim 17, wherein the step of determining whether or not the predefined actuator configuration should be reconfigured based on at least the foldable tactile display's orientation includes determining whether or not the predefined actuator configuration should be reconfigured based on the foldable tactile display's folding configuration.

19. The method according to claim 18, wherein measurements performed by the plurality of sensors result in the determination of the folding configuration.

* * * * *